(12) United States Patent
Youtz et al.

(10) Patent No.: US 10,965,643 B2
(45) Date of Patent: *Mar. 30, 2021

(54) ACCESS POINT NAME MANAGEMENT

(71) Applicant: Verizon Patent and Licensing Inc., Arlington, VA (US)

(72) Inventors: Andrew Youtz, Princeton, NJ (US); Warren Hojilla Uy, Randolph, NJ (US); Siegfried Erhard Eichinger, West Chester, PA (US); James Mathison, Warren, NJ (US); Christopher M. Schmidt, Branchburg, NJ (US)

(73) Assignee: Verizon Patent And Licensing Inc., Basking Ridge, NJ (US)

( * ) Notice: Subject to any disclaimer, the term of this patent is extended or adjusted under 35 U.S.C. 154(b) by 7 days.

This patent is subject to a terminal disclaimer.

(21) Appl. No.: 16/423,823

(22) Filed: May 28, 2019

(65) Prior Publication Data
US 2019/0281016 A1    Sep. 12, 2019

Related U.S. Application Data

(63) Continuation of application No. 15/369,137, filed on Dec. 5, 2016, now Pat. No. 10,348,679.

(51) Int. Cl.
*H04L 29/12* (2006.01)
*H04W 28/02* (2009.01)

(52) U.S. Cl.
CPC ..... *H04L 61/3075* (2013.01); *H04W 28/0268* (2013.01); *H04L 61/1588* (2013.01); *H04L 61/6068* (2013.01)

(58) Field of Classification Search
CPC .................................................. H04L 61/3075
See application file for complete search history.

(56) References Cited

U.S. PATENT DOCUMENTS

| | | | |
|---|---|---|---|
| 8,797,856 B1 | 8/2014 | Ballal et al. | |
| 9,357,467 B1 | 5/2016 | Bartlett et al. | |
| 9,516,572 B1* | 12/2016 | Velusamy | H04W 8/08 |
| 10,348,679 B2* | 7/2019 | Youtz | H04L 61/3075 |
| 2012/0113865 A1 | 5/2012 | Zhao et al. | |
| 2013/0170435 A1 | 7/2013 | Dinan | |
| 2013/0265879 A1 | 10/2013 | Qiang et al. | |
| 2013/0337808 A1 | 12/2013 | Zhao et al. | |
| 2015/0215845 A1 | 7/2015 | Pinheiro et al. | |
| 2016/0165526 A1 | 6/2016 | Neil et al. | |

* cited by examiner

*Primary Examiner* — Jason E Mattis

(57) ABSTRACT

A computer device may include a memory configured to store instructions and a processor configured to execute the instructions to select to use an access point name (APN) table to be received from a wireless access network and attach to the wireless access network. The processor may be further configured to execute the instructions to receive a Protocol Configuration Options (PCO) message from the wireless access network; retrieve the APN table from the received PCO message; select an APN from the retrieved APN table; and connect to a packet data network associated with the selected APN via the wireless access network using the selected APN.

20 Claims, 12 Drawing Sheets

714 ⟶

| b8 | b7 | b6 | b5 | b4 | b3 | b2 | b1 | BIT (730) |
|----|----|----|----|----|----|----|----|-----|
| 1 | X | X | X | X | X | X | X | APN AVAILABLE ON HPLMN/EHPLMN |
| 0 | X | X | X | X | X | X | X | APN NOT AVAILABLE ON HPLMN/EHPLMN |
| X | 1 | X | X | X | X | X | X | APN AVAILABLE ON VPLMN |
| X | 0 | X | X | X | X | X | X | APN NOT AVAILABLE ON VPLMN |
| 1 | X | 1 | 0 | 0 | X | X | X | IPv4 ON HPLMN/EHPLMN |
| 1 | X | 0 | 1 | 0 | X | X | X | IPv6 ON HPLMN/EHPLMN |
| 1 | X | 0 | 0 | 1 | X | X | X | IPv4v6 ON HPLMN/EHPLMN |
| X | 1 | X | X | X | 1 | 0 | 0 | IPv4 ON VPLMN |
| X | 1 | X | X | X | 0 | 1 | 0 | IPv6 ON VPLMN |
| X | 1 | X | X | X | 0 | 0 | 1 | IPv4v6 ON VPLMN |

800

| PCO HEADER 810 ||
|---|---|
| PROTOCOL ID 820-A | PROTOCOL CONTENT 825-A |
| ⋮ | ⋮ |
| PROTOCOL ID 820-N | PROTOCOL CONTENT 825-N |
| CONTAINER ID 830-A | CONTAINER CONTENT 835-A |
| ⋮ | ⋮ |
| APN TABLE CONTAINER ID (830-X) | APN TABLE 835-X |
| ⋮ | ⋮ |
| APN TABLE UPDATE CONTAINER ID (830-Y) | APN TABLE UPDATE STATUS 835-Y |
| ⋮ | ⋮ |
| CONTAINER ID 830-N | CONTAINER CONTENT 835-N |

FIG. 8

ACCESS POINT NAME MANAGEMENT

CROSS REFERENCE TO RELATED APPLICATIONS

This patent application is a continuation of U.S. patent application Ser. No. 15/369,137, filed on Dec. 5, 2016, the contents of which are hereby incorporated herein by reference in their entirety.

BACKGROUND INFORMATION

In order to satisfy the needs and demands of users of mobile communication devices, providers of wireless communication services continue to improve and expand available services as well as networks used to deliver such services. One aspect of such improvements includes the development of wireless access networks as well as options to utilize such wireless access networks. The provider may manage a large number of wireless access networks. In order to maintain a quality of service across a network, or across multiple networks, the provider may need to take into account various requests received from wireless communication devices.

BRIEF DESCRIPTION OF THE DRAWINGS

FIG. 8 is a diagram illustrating an exemplary Protocol Configuration Option (PCO) message according to an implementation described herein;

DETAILED DESCRIPTION OF PREFERRED EMBODIMENTS

Figure 1:
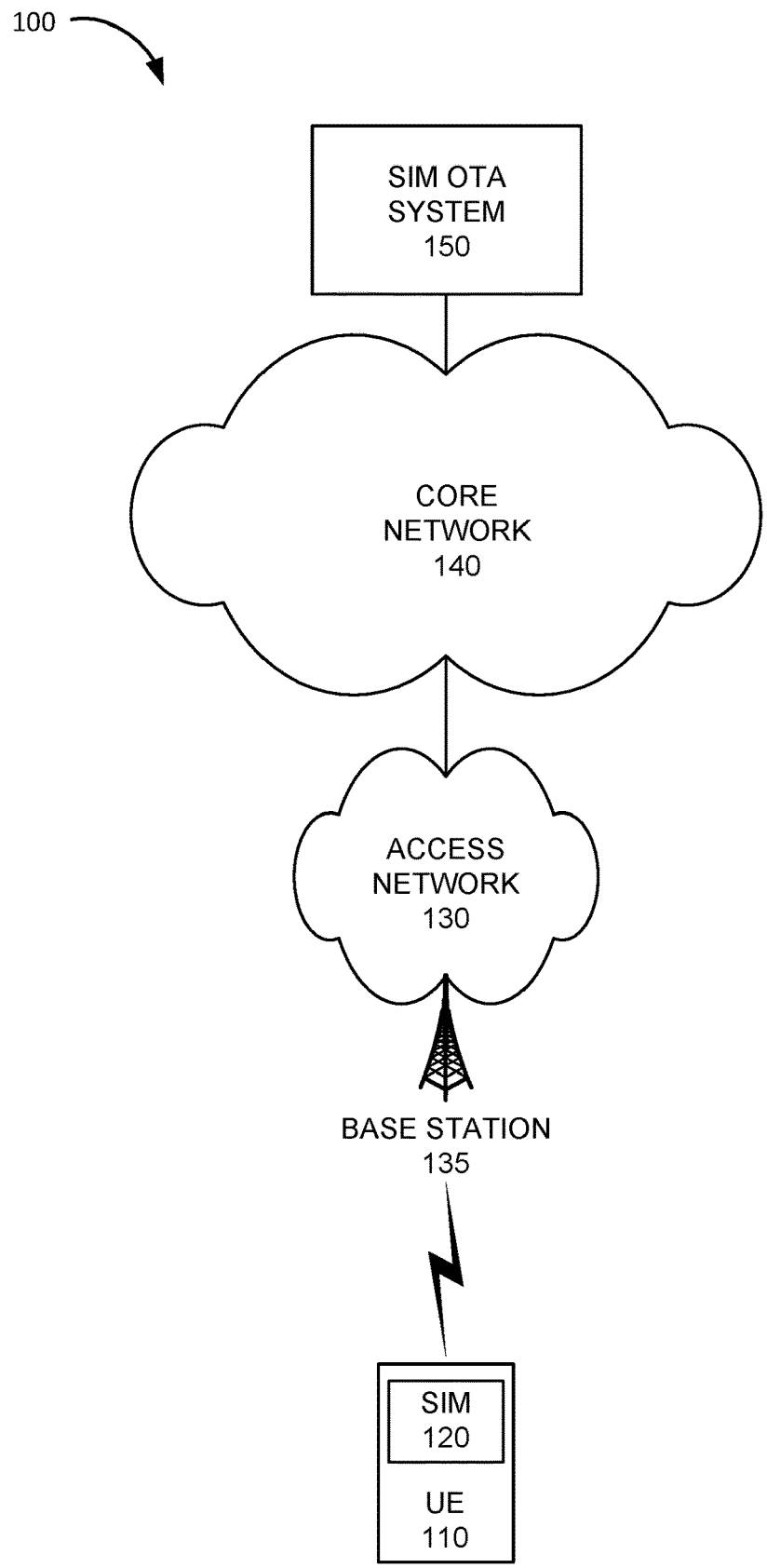
FIG. 1 is a diagram illustrating an environment according to an implementation described herein.

The following detailed description refers to the accompanying drawings. The same reference numbers in different drawings identify the same or similar elements.

Implementations described herein relate to Access Point Name (APN) management. When a wireless communication device, such as a mobile phone, a tablet computer, or a fixed wireless device (e.g., a smart meter) selects to use a particular application or service over a network, the wireless communication device may need to connect to a packet data network (PDN) gateway associated with particular application or service. An APN may correspond to the name of a particular PDN. Thus, an APN may be supported by a gateway or a group of gateways between a wireless access network, associated with a provider of wireless communication services, and another computer network.

A user equipment (UE) device may include an APN table. The APN table may include a list of APNs for the available PDNs that the UE device may use. For example, a provider of wireless communication services may program a wireless communication device, also referred to herein as a user equipment (UE) device, with an APN table that includes a list of APNs reachable via the provider's wireless communication networks. However, customers are increasingly bringing their own devices (BYOD) when purchasing a subscription for wireless communication services. Furthermore, manufacturers of UE devices are moving toward universal hardware and software solutions rather than customizing a UE device to a provider's specifications. Thus, a provider of wireless communication services may not be able to control hardware and/or software on a UE device prior to the UE device attaching to the provider's wireless access network. For example, the provider may not be able to program a UE device with an APN table before the UE device attempts to the use a wireless access network associated with the provider. Thus, the UE device may request an APN that may not be recognized by the provider's wireless access network and the wireless access network may not be able to process the UE device's connection request, resulting in the UE device being unable to connect to a requested application or service.

One possible solution to provide an APN table to a new UE device may be to use an Open Mobile Alliance (OMA) Device Management (DM) application layer protocol. However, no standardized and universally accepted format for APN management has been established. Furthermore, many UE devices may not support an OMA DM application. Efforts to create a standardized APN table based on OMA DM configurability may not be practical because such a solution may require agreement by many manufacturers of devices and providers of communication services.

Another possible solution may be to generate a mapping between the provider's APNs and APNs requested by UE devices. However, the large number of possible APNs that may be requested by UE devices may render such an attempted mapping impractical. For example, each enterprise (e.g., company, organization, government agency, etc.) may program UE devices used by employees with an application that directs a UE device to connect to private APNs associated with the enterprise. Moreover, the provider may have no way of predicting what APNs customer UE devices may request. Yet another possible solution may be to direct a user to manually program an APN table into a UE device. However, such a manual programming task may entail different processes for different UE devices and may be challenging and undesirable for users to perform.

Implementations described herein relate to a pushing an APN table to a UE device by a wireless access network. The APN table may be maintained by the wireless access network. An element (e.g., device) in the wireless access network may detect that a UE device has attached to the wireless access network, may obtain information stored in the APN table, and may provide the obtained APN table information to the UE device in a message sent to the UE device. The wireless access network may correspond to a wireless access network configured to send Protocol Configuration Options (PCO) messages to the wireless communication device. For example, the wireless access network may correspond to a Long Term Evolution (LTE) access network, an enhanced High Rate Packet Data (eHRPD) access network, and/or another type of wireless access network. A PCO message may be used by the wireless access network to provide various types of information to the UE device that the UE device may need when communicating with the wireless access network. The APN table information may be incorporated into a PCO message and sent to the UE device during the attachment procedure.

The UE device may be configured to select to use an APN table to be received from the wireless access network. The UE device may attach to the wireless access network, receive the PCO message from the wireless access network, retrieve the APN table from the received PCO message, select an APN from the retrieved APN table, and connect to a PDN associated with the selected APN via the wireless access network using the selected APN. Furthermore, the APN table may be stored for future use. For example, the UE device may send a combined attach request and PDN connectivity request using an APN from the stored APN table in a future attachment request. The UE device may receive a new APN table in a PCO message during the future attachment request and may update the stored APN table based on the received new APN table.

The APN table information stored in the wireless access network and provided to the UE device in the PCO message may include a set of APN records. Each APN record may include information identifying an APN for a particular PDN; an availability for the particular PDN that indicates whether the particular PDN is available on a home network only, on a roaming network only, or on both home and roaming network; a type of Internet Protocol (IP) address type to be used with the particular PDN; an application access for the particular PDN that indicates a type of application associated with the particular PDN; one or more Quality of Service (QoS) classes associated with the particular PDN; and/or other types of information associated with the particular PDN.

The UE device may select the APN from the retrieved APN table based on an application or service requesting a connection. APNs that may be identified in the APN table may include, for example, an Internet Protocol Multimedia Subsystem (IMS) APN, an Internet access APN, a Multimedia Messaging Service (MMS) APN, a device management APN, a Subscriber Identity Module (SIM) APN, one or more private packet data network APNs, and/or other types of APNs. The APN may be selected based on a connection request received from an IMS application, an Internet access application, an MMS application, a device management application, a SIM management application, a private packet data network application, and/or another type of application or service running on the UE device.

Furthermore, the APN table information in the PCO message may include information identifying a preferred attachment APN. The UE device may determine whether the retrieved APN table includes a preferred attachment APN and select to use the preferred attachment APN for subsequent wireless access network attachments when the retrieved APN table includes the preferred attachment APN.

Furthermore, the APN table information in the PCO message may include information identifying a default APN. The UE device may determine whether the retrieved APN table includes a default APN and select to use the default APN when an application requesting a connection is not associated with any other APNs in the retrieved APN table when the retrieved APN table includes the default APN.

Furthermore, the UE device may determine a QoS class associated with an application or service requesting the connection and select the APN based on the determined QoS class. Furthermore, the UE device may determine an IP address type associated with the selected APN and use the determined IP address type when communicating with the PDN associated with the selected APN.

In some implementations, an APN table may be stored on a SIM card included in the UE device. Updates to the APN table may be pushed to the SIM card via a SIM Over-the-Air (OTA) system during an initial attach procedure and/or when an update to the APN table is required. In some implementations, the SIM OTA system may send a message directly to the UE device indicating that an APN table update is available and the UE device may connect to the SIM OTA system via the wireless access network to obtain the APN table updates from the SIM OTA system.

In other implementations, the SIM OTA system may send an indication to the wireless access network that an update to the APN table is available. In response, the wireless access network may generate a PCO message with an APN table update status indication and send the PCO message to the UE device. The UE device may receive the PCO message, identify the APN table update status indication, determine that an APN table update is available for the SIM card, and instruct the SIM card to obtain the APN table update from the SIM OTA system.

In yet other implementations, the APN table may be stored directly on the UE devices and APN table updates may be pushed to the UE device via the SIM OTA system either directly from the SIM OTA system or via an indication sent by the SIM OTA system to the wireless access system and the wireless access system forwarding the indication to the UE device in a PCO message.

FIG. 1 is a diagram of an exemplary environment 100 in which the systems and/or methods, described herein, may be implemented. As shown in FIG. 1, environment 100 may include a UE device 110, an access network 130, a core network 140, and a SIM OTA system 150.

UE device 110 may include a mobile communication device (e.g., a mobile phone, a smart phone, a phablet device, a wearable computer device (e.g., a head-mounted display computer device, a wristwatch computer device, etc.), a global positioning system (GPS) device, and/or another type of wireless device); a laptop computer, a tablet computer, or another type of portable computer; a media playing device; a portable gaming system; and/or any other type of mobile computer device with communication and output capabilities.

In some implementations, UE device 110 may correspond to an embedded wireless device that communicates wirelessly with other devices over a machine-to-machine (M2M) interface. For example, UE device 110 may be electrically connected to any electronic device with a microcontroller, such as a microcontroller controlling one or more actuators, a microcontroller controlling one or more sensors, a microcontroller that performs data processing, and/or another type of electronic device with a microcontroller. Examples of such devices may include a health monitoring device (e.g., a blood pressure monitoring device, a blood glucose monitoring device, etc.), an asset tracking device (e.g., a system monitoring the geographic location of a fleet of vehicles, etc.), a device controlling one or more functions of a vehicle (e.g., a climate control system, an engine monitoring system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, etc.), a device controlling a financial transaction system (e.g., a point-of-sale terminal, a vending machine, etc.), and/or another type of electronic device.

UE device 110 may include a SIM card 120. SIM card 120 may also be referred to as a Universal Integrated Circuit Card (UICC) or a Groupe Spécial Mobile Association (GSMA)-compliant embedded UICC (eUICC). An eUICC may store information for one or more subscriptions that may be activated for UE device 110. SIM card 120 may be electrically coupled to UE device 110 by being inserted into a slot of UE device 110 (not shown in FIG. 1). In other implementations, SIM card 120 may be soldered into place and may not be removable. UE device 110 may wirelessly communicate with one or more of access networks 130. In some implementations, SIM card 120 may store an APN table and UE device 110 may use the APN table stored on SIM card 120. SIM card 120 may be configured to communicate with SIM OTA system 150 and may receive updates for the APN table from SIM OTA system 150.

Access network 130 may provide access to core network 140 for wireless devices, such as UE device 110. Access network 130 may enable UE device 110 to connect to core network 140 for mobile telephone service, Short Message Service (SMS) message service, Multimedia Message Service (MMS) message service, Internet access, cloud computing, and/or other types of data services. Access network 130 may include a base station 135 and UE device 110 may wirelessly communicate with access network 130 via base station 135. Access network 130 may establish a packet data network connection between UE device 110 and core network 140 via one or more APNs. For example, access network 130 may establish an Internet Protocol (IP) connection between UE device 110 and core network 140.

In some implementations, access network 130 may include a Long Term Evolution (LTE) access network (e.g., an evolved packet core (EPC) network) based on the LTE standard specified by the 3$^{rd}$ Generation Partnership Project (3GPP). In other implementations, access network 130 may include a Code Division Multiple Access (CDMA) access network based on, for example, a CDMA2000 standard. For example, the CDMA access network may include a CDMA enhanced High Rate Packet Data (eHRPD) network (which may provide access to an LTE core network).

Core network 140 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, the Internet, or a combination of networks. Core network 140 may allow the delivery of IP services to UE device 110, and may interface with other external networks. Core network 140 may include one or more server devices and/or network devices, or other types of computation or communication devices. In one example implementation, core network 140 may include an Internet Protocol Multimedia Sub-system (IMS) network (not shown in FIG. 1). An IMS network may include a network for delivering IP multimedia services as specified by 3GPP and may provide media flows between UE device 110 and external IP networks or external circuit-switched networks (not shown in FIG. 1).

SIM OTA system 150 may include one or more devices, such as computer devices and/or server devices, which perform OTA activation and/or OTA updates for SIM card 120. For example, SIM OTA system 150 may authenticate SIM card 120 via access network 130 and/or may provide an assigned telephone number to SIM card 120. Furthermore, SIM OTA system 160 may provide updates to an APN table stored on SIM card 120.

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
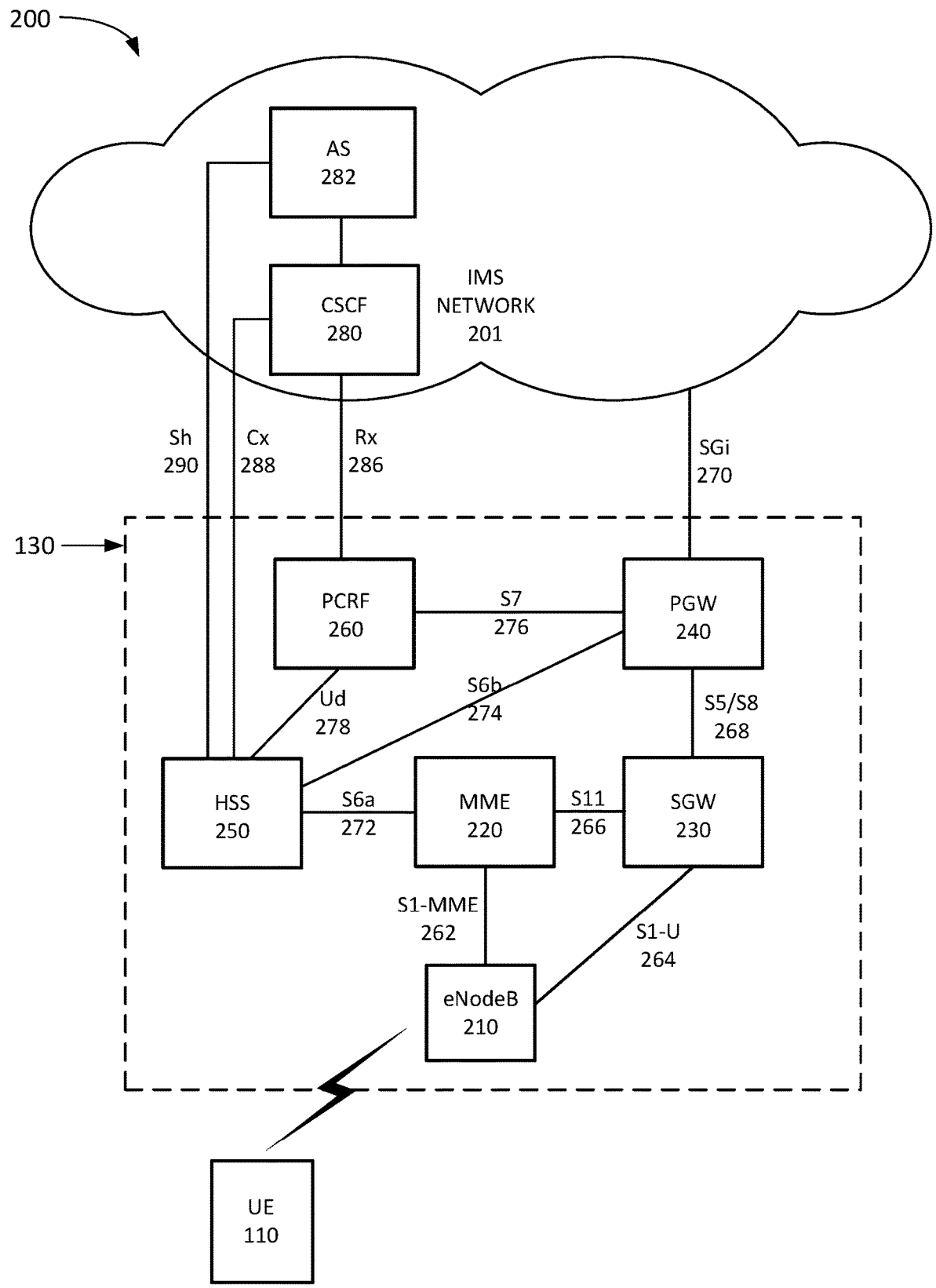
FIG. 2 is a diagram illustrating exemplary components of the access network of FIG. 1 and exemplary components of an Internet Protocol Multimedia Subsystem network that may be included in the core network of FIG. 1.

FIG. 2 is a diagram illustrating exemplary components of a system 200 that includes access network 130 and an IMS network 201 according to an implementation described herein. IMS network 201 may be included in provider network 140 and may include a network for delivering IP multimedia services as specified by 3GPP or other standards/protocols and may provide media flows between UE device 110 and external IP networks or external circuit-switched networks.

As shown in FIG. 2, system 200 may include UE device 110, access network 130, and IMS network 201. Access network 130 may correspond to a Long Term Evolution (LTE) access network. Access network 130 may include one or more devices that implement logical entities interconnected via standardized interfaces, and that provide wireless packet-switched services and wireless IP connectivity to user devices for both data and voice services. Access network 130 may include eNodeB 210 (corresponding to base station 135), a mobility management entity (MME) 220, a serving gateway (SGW) 230, a packet data network gateway (PGW) 240, a home subscriber server (HSS) 250, and a Policy and Charging Rules Function (PCRF) 260. IMS network 201 may include a Call Session Control Flow (CSCF) 280 and an application server (AS) 282. While FIG. 2 depicts a single eNodeB 210, MME 220, SGW 230, PGW 240, HSS 250, PCRF 260, CSCF 280, and AS 282 for illustration purposes, in practice, FIG. 2 may include multiple eNodeBs 210, MMEs 220, SGWs 230, PGWs 240, HSS 250, PCRFs 260, CSCFs 280, and/or AS 282.

eNodeB 210 may include one or more devices (e.g., base stations) and other components and functionality that allow UE device 110 to wirelessly connect to access network 130 (e.g., base station 135). eNodeB 210 may include or be associated with one or more cells. For example, each cell may include a radio frequency (RF) transceiver facing a particular direction. eNodeB 210 may interface with access network 130 via an interface referred to as an S1 interface, which may be split into a control plane S1-MME interface 262 and a data plane S1-U interface 264. S1-MME interface 262 may interface with MME 220. S1-MME interface 262 may be implemented, for example, with a protocol stack that includes a Network Access Server (NAS) protocol and/or Stream Control Transmission Protocol (SCTP). An S1-U interface 264 may interface with SGW 230 and may be implemented, for example, using GPRS Tunneling Protocol (GTP) version 2 (GTPv2).

MME 220 may implement control plane processing for access network 130. For example, MME 220 may implement tracking and paging procedures for UE device 110, may activate and deactivate bearers for UE device 110, may authenticate a user of UE device 110, and may interface to non-LTE radio access networks. A bearer may represent a logical channel with particular quality of service (QoS) requirements. MME 220 may also select a particular SGW 230 for a particular UE device 110. A particular MME 220 may interface with other MMEs 220 in access network 130 and may send and receive information associated with UE devices 110, which may allow one MME 220 to take over control plane processing of UE devices serviced by another MME 220, if the other MME 220 becomes unavailable.

SGW 230 may provide an access point to and from UE device 110, may handle forwarding of data packets for UE device 110, and may act as a local anchor point during handover procedures between eNodeBs 210. SGW 230 may interface with PGW 240 through an S5/S8 interface 268. S5/S8 interface 268 may be implemented, for example, using GTPv2.

PGW 240 may function as a gateway to provider network 240 and/or IMS network 201 through an SGi interface 270. A particular UE device 110, while connected to a single SGW 230, may be connected to multiple PGWs 240, one for each packet network with which UE device 110 communicates. For example, a particular PGW 240 may be associated with a particular PDN and UE device 110 may connect to the particular PDN by connecting to the PGW 240 associated with the particular PDN using an APN associated with the particular PDN. Thus, UE device 110 may be connected to one or more PDNs at a particular time. PGW 240 may send PCO messages to UE device 110. A PCO message sent by PGW 240 to UE device 110 may include APN table information.

MME 220 may communicate with SGW 230 through an S11 interface 266. S11 interface 266 may be implemented, for example, using GTPv2. S1 interface 266 may be used to create and manage a new session for a particular UE device 110. S1 interface 266 may be activated when MME 220 needs to communicate with SGW 230, such as when the particular UE device 110 attaches to access network 130, when bearers need to be added or modified for an existing session for the particular UE device 110, when a connection to a new PGW 240 needs to be created, or during a handover procedure (e.g., when the particular UE device 110 needs to switch to a different SGW 230).

HSS 250 may store information associated with UE devices 210 and/or information associated with users of UE devices 210. For example, HSS 250 may store subscription profiles that include authentication and access authorization information. Each subscription profile may include a list of UE devices 210 associated with the subscription as well as an indication of which UE device 110 is active (e. g., authorized to connect to access network 130 and to IMS network 201 via access network 130).

MME 220 may communicate with HSS 250 through an S6a interface 272. S6a interface 272 may be implemented, for example, using a Diameter protocol. PGW 240 may communicate with HSS 250 through an S6b interface 274. S6b interface 274 may be implemented, for example, using a Diameter protocol. In some implementations, HSS 250 may store APN table information and PGW 240 may obtain some or all of the stored APN table information from HSS 250 via S6b interface 274.

PCRF 260 may implement policy charging and rule functions, such as establishing QoS requirements, bandwidth, and/or charges for a particular service for a UE device 110. PCRF 260 may communicate with PGW 240 through an S7 interface 276 and may communicate with HSS 250 through a Ud interface 278. S7 interface 276 may be based on a legacy Gx interface and may be implemented, for example, using Diameter protocol. Ud interface 278 may be used to exchange subscription data between PCRF 260 and HSS 250 and may be based on a provider specified protocol.

IMS network 201 may be associated with an IMS core identity for a particular subscription for UE device 110. HSS 250 may receive information identifying the IMS core identity for a subscription and may provide the IMS core identity to a particular UE device 110 that is connected to access network 130. CSCF 280 may handle signaling, controlling of media paths, and activation of applications in IMS network 201. AS 282 may implement particular services and interact with CSCF 280 to deliver the particular services to UE device 110. CSCF 280 may communicate with PCRF 260 through an Rx interface 286 and may communicate with HSS 250 through a Cx interface 288. Rx interface 286 and Cx interface 288 may be implemented, for example, using Diameter protocol. AS 282 may communicate with HSS 250 through an Sh interface 290. Sh interface 290 may be implemented, for example, using Diameter protocol.

Although FIG. 2 shows exemplary components of access network 130 and IMS network 201, in other implementations, access network 130 and/or IMS network 201 may include fewer components, different components, differently arranged components, or additional components than depicted in FIG. 2. Additionally or alternatively, one or more components of access network 130 and/or IMS network 201 may perform functions described as being performed by one or more other components of access network 130 and/or IMS network 201.

Figure 3:
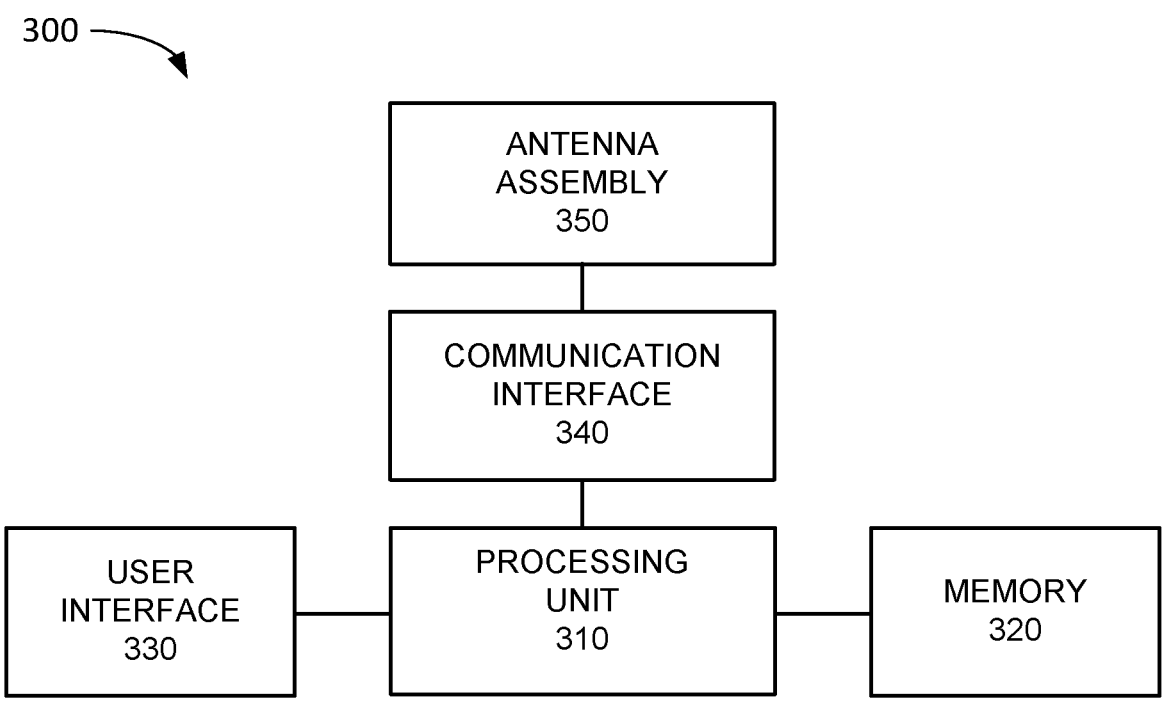
FIG. 3 is a diagram illustrating exemplary components of a device that may be included in a device of FIG. 1 or a device of FIG. 2.

FIG. 3 is a diagram illustrating example components of a device 300 according to an implementation described herein. UE device 110, SIM card 120, eNodeB 210, MME 220, SGW 230, PGW 240, HSS 250. PCRF 260, CSCF 280, AS 282, and/or SIM OTA system 150 may each include one or more devices 300 or components of device 300. As shown in FIG. 3, device 300 may include a processing unit 310, a memory 320, a user interface 330, a communication interface 340, and an antenna assembly 350.

Processing unit 310 may include one or more of any type of single-core processor, multi-core processor, microprocessor, latch-based processor, and/or processing logic (or families of processors, microprocessors, and/or processing logics) that interprets and executes instructions. In other embodiments, processing unit 310 may include an application-specific integrated circuit (ASIC), a field-programmable gate array (FPGA), and/or another type of integrated circuit or processing logic. Processing unit 310 may control operation of device 300 and its components.

Memory 320 may include any type of dynamic storage device that may store information and/or instructions, for execution by processing unit 310, and/or any type of non-volatile storage device that may store information for use by processing unit 310. For example, memory 320 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

User interface 330 may allow a user to input information to device 300 and/or to output information from device 300. Examples of user interface 330 may include a speaker to receive electrical signals and output audio signals; a camera to receive image and/or video signals and output electrical signals; a microphone to receive sounds and output electrical signals; buttons (e.g., a joystick, control buttons, a keyboard, keys of a keypad, a mouse, a tracking pad, a stylus, a remote control, etc.) and/or a touchscreen to receive control commands; a display, such as an LCD, to output visual information; an actuator to cause device 300 to vibrate; and/or any other type of input or output device. In some embodiments, device 300 may be managed remotely and may not include user interface 330. In other words, in some implementations, device 300 may be "headless" and may not include a keyboard and/or a display device, for example.

Communication interface 340 may include a transceiver that enables mobile communication device 110 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 340 may include a transmitter that converts baseband signals to radio frequency (RF) signals and/or a receiver that converts RF signals to baseband signals. Communication interface 340 may be coupled to antenna assembly 350 for transmitting and receiving RF signals.

Communication interface 340 may include a logical component that includes input and/or output ports, input and/or output systems, and/or other input and output components that facilitate the transmission of data to other devices. For example, communication interface 340 may include a network interface card (e.g., Ethernet card) for wired communications and/or a wireless network interface (e.g., a WiFi) card for wireless communications. Communication interface 340 may also include a universal serial bus (USB) port for communications over a cable, a Bluetooth™ wireless interface, a radio-frequency identification (RFID) interface, a near-field communications (NFC) wireless interface, an optical transceiver, and/or any other type of interface that converts data from one form to another form.

If device 300 is included in UE device 110 or eNodeB 210, device 300 may include antenna assembly 350. Antenna assembly 350 may include one or more antennas to transmit and/or receive RF signals. Antenna assembly 350 may, for example, receive RF signals from communication interface 340 and transmit the signals and receive RF signals and provide them to communication interface 340.

As described herein, device 300 may perform certain operations in response to processing unit 310 executing software instructions contained in a computer-readable medium, such as memory 320. A computer-readable medium may be defined as a non-transitory memory device. A non-transitory memory device may include memory space within a single physical memory device or spread across multiple physical memory devices. The software instructions may be read into memory 320 from another computer-readable medium or from another device via communication interface 340. The software instructions contained in memory 320 may cause processing unit 310 to perform processes that will be described later. Alternatively, hardwired circuitry may be used in place of, or in combination with, software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. Additionally or alternatively, one or more components of device 300 may perform the tasks described as being performed by one or more other components of device 300.

Figure 4:
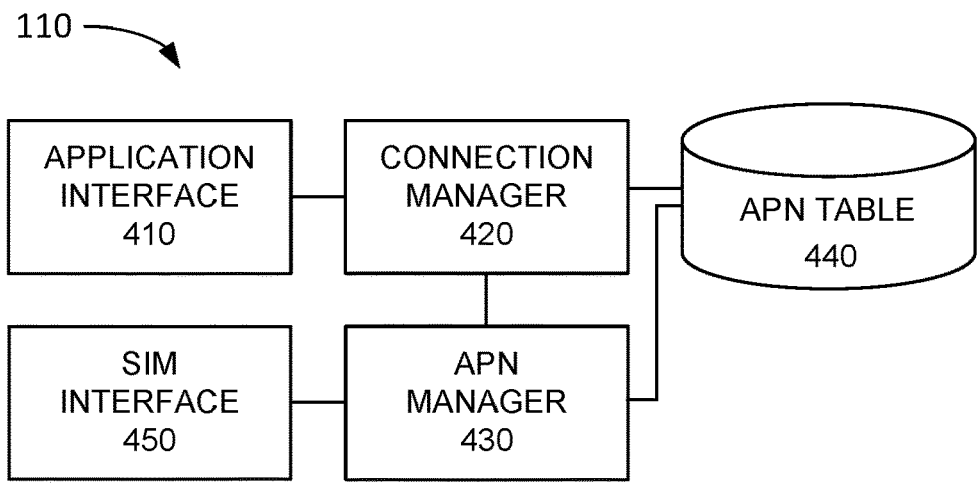
FIG. 4 is a diagram illustrating exemplary functional components of the user equipment (UE) device of FIG. 1.

FIG. 4 is a diagram illustrating exemplary functional components of UE device 110. The functional components of UE device 110 may be implemented, for example, via processing unit 310 executing instructions from memory 320. Alternatively, some or all of the functional components included in UE device 110 may be implemented via hard-wired circuitry. As shown in FIG. 4, UE device 110 may include an application interface 410, a connection manager 420, an APN manager 430, an APN table 440, and a SIM interface 450.

Application interface 410 may be configured to communicate with applications and/or services on UE device 110 when the applications and/or services request a connection across a network. Application interface 410 may identify a type of application associated with a received request and may forward the request, along with the information identifying the type of application making the request, to connection manager 420. Connection manager 420 may be configured to communicate with access network 130. For example, connection manager 420 may attach to access network 130 and may request a connection to a PDN selected by APN manager 430.

APN manager 430 may select an APN from APN table 440 based on information obtained from application interface 410 and based on information stored in APN table 440. APN table 440 may store APN table information. Exemplary information that may be stored in APN table 440 is described below with reference to FIGS. 7A-7C. SIM interface 450 may be configured to communicate with SIM card 120. In some implementations, the APN table may be stored on SIM card 120. SIM interface 450 may be configured to enable communication between SIM card 120 and SIM OTA system 150 to perform updates to the APN table stored on SIM card 120.

Although FIG. 4 shows exemplary components of UE device 110, in other implementations, UE device 110 may include fewer components, different components, additional components, or differently arranged components than depicted in FIG. 4. Additionally or alternatively, one or more components of UE device 110 may perform one or more tasks described as being performed by one or more other components of UE device 110.

Figure 5:
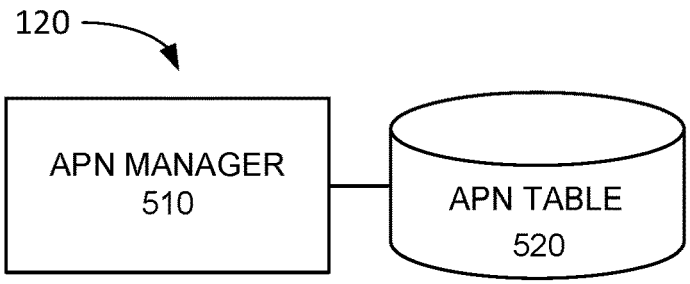
FIG. 5 is a diagram illustrating exemplary functional components of the Subscriber Identity Module (SIM) card of FIG. 1.

As mentioned above, in some implementations, an APN table may be stored on SIM card 120, instead of, or in addition to, being stored in UE device 110. FIG. 5 is a diagram illustrating exemplary functional components of SIM card 120. The functional components of SIM card 120 may be implemented, for example, via processing unit 310 executing instructions from memory 320. Alternatively, some or all of the functional components included in SIM card 120 may be implemented via hard-wired circuitry. As shown in FIG. 5, SIM card 120 may include an APN manager 510 and an APN table 520.

APN manager 510 may manage APN table information stored in APN table 520. Exemplary information that may be stored in APN table 520 is described below with reference to FIGS. 7A-7C. APN manager 510 may select an APN based on a connection request detected by, for example, application interface 410. Additionally or alternatively, APN manager 510 may manage updates for APN table 520. For example, in implementations where the APN table is stored on SIM card 120, if an indication of an available update is received by UE device 110 from SIM OTA system 150, or, alternatively, in a PCO message and passed on to SIM card 120, APN manager 510 may initiate an APN table update process with SIM OTA system 150 and may update APN table 520 based on an APN update received from SIM OTA system 150.

Although FIG. 5 shows exemplary components of SIM card 120, in other implementations, SIM card 120 may include fewer components, different components, additional components, or differently arranged components than depicted in FIG. 5. Additionally or alternatively, one or more components of SIM card 120 may perform one or more tasks described as being performed by one or more other components of SIM card 120.

Figure 6:
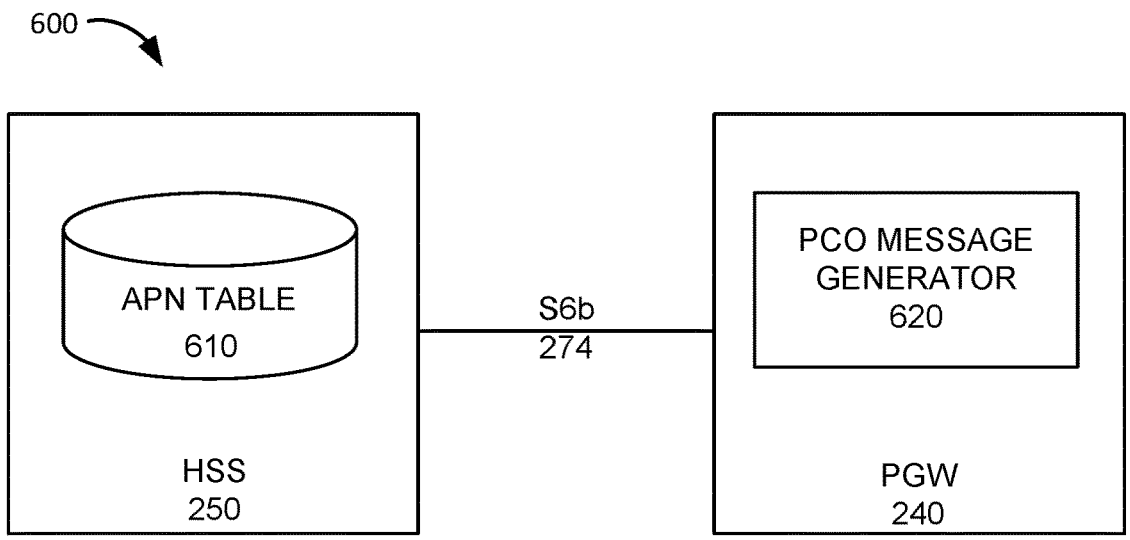
FIG. 6 is a diagram illustrating exemplary functional components of the wireless access network of FIG. 2.

FIG. 6 is a diagram illustrating exemplary functional components of a system 600 included in access network 130. The functional components of system 600 may be implemented, for example, via processing unit 310 executing instructions from memory 320 in HSS 250 and in PGW 240. Alternatively, some or all of the functional components included in system 600 may be implemented via hard-wired circuitry. As shown in FIG. 6, system 600 may include HSS 250 and PGW 240.

HSS 250 may include APN table 610. Exemplary information that may be stored in APN table 610 is described below with reference to FIGS. 7A-7C. PGW 240 may include PCO message generator 620. PCO message generator 620 may generate a PCO message to be sent to UE device 110 during, or after, an attach procedure. The generated PCO message may include information needed by UE device 110 for communicating with access network 130. PCO message generator 620 may obtain APN table information from HSS 250 over S6b interface 274 and may incorporate the APN table information into the generated PCO message before sending the PCO message to UE device 110.

Although FIG. 6 shows exemplary components of system 600, in other implementations, system 600 may include fewer components, different components, additional components, or differently arranged components than depicted in FIG. 6. Additionally or alternatively, one or more components of system 600 may perform one or more tasks described as being performed by one or more other components of system 600. As an example, in other implementations, some or all of the APN table information may be stored in another component of access network 130, such as PGW 240 or MME 220. As another example, the APN table information may be obtained by PGW 240 via a different interface. For example, MME 220 may obtain the APN table information from HSS 250 via S6a interface 272 and provide the APN table information to PGW 240 or SGW 230. As yet another example, the PCO message may be generated by another component of access network 130, such as by MME 220.

Figure 7A:
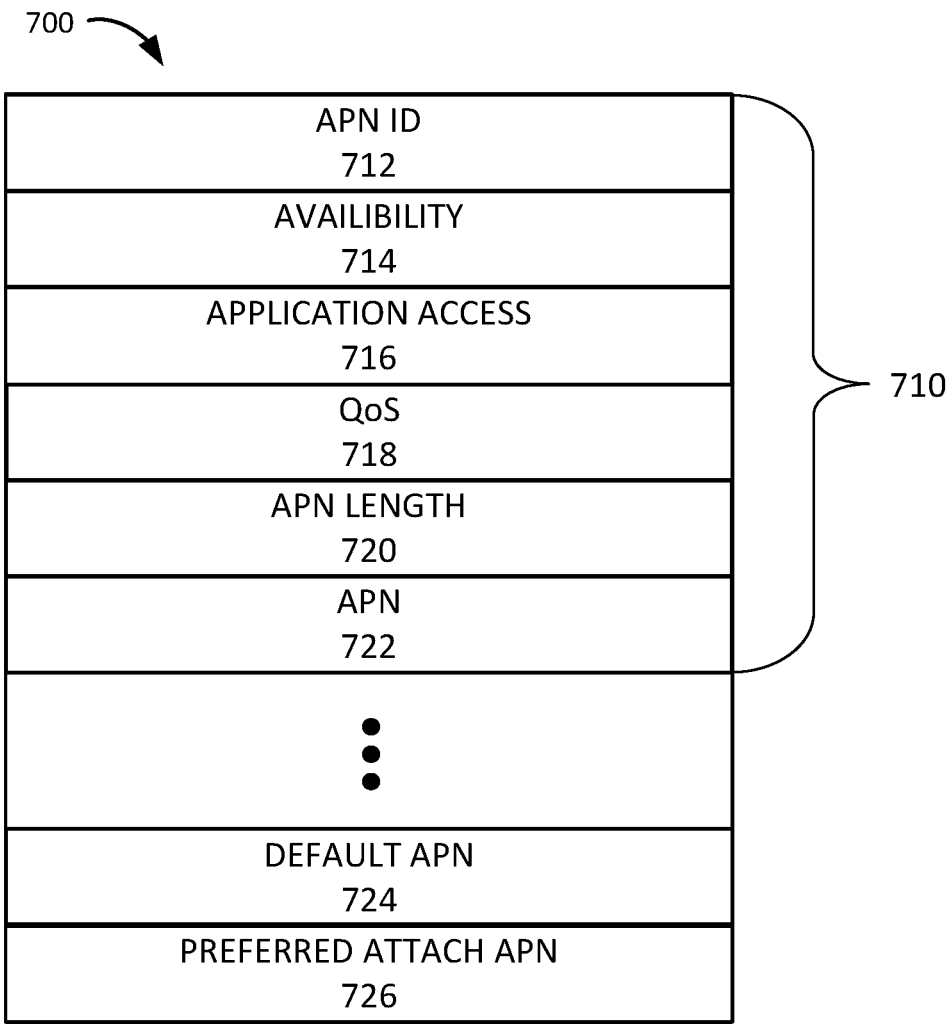
FIGS. 7A-7C are diagrams illustrating exemplary components that may be stored in an Access Point Name (APN) table according to an implementation described herein.

FIG. 7A is a diagram illustrating exemplary components that may be stored in an APN table 700. The components of APN table 700 may correspond to information stored in APN table 440, APN table 520, and/or APN table 610. As shown in FIG. 7A, APN table 700 may include one or more APN records 710, a default APN field 724, and a preferred attach APN field 726.

Each APN record 710 may store information for a particular PDN. APN record 710 may include an APN identifier (ID) field 712, an availability field 714, an application access field 716, a QoS field 718, an APN length field 720, and an APN field 722.

APN ID field 712 may store an identifier that uniquely identifier a particular PDN that is recognized by access network 130. Availability field 714 may store information identifying whether the particular PDN is available on a home network only, on a visited network only, or both home and visited networks. Furthermore, availability field 714 may include information identifying the type of IP address to use when communicating with the particular PDN.

Exemplary information that may be stored in availability field 714 is described below in more detail with reference to FIG. 7B. Application access field 716 may store information identifying a type of application or service associated with the particular PDN. Exemplary information that may be stored in application access field 716 is described below in more detail with reference to FIG. 7B.

QoS field 718 may store information identifying one or more QoS classes associated with the particular PDN. Different PDNs for a same type of application may be available for different QoS classes. For example, a first private PDN, associated with an enterprise, may be associated with a high QoS (e.g., real-time audio or video) and a second private PDN, associated with the enterprise, may be associated with a low QoS (e.g., best effort data traffic).

APN length field 720 may store information identifying the length of the APN for the particular PDN. Identifying the length of the APN may enable access network 130 to reduce the length of the APN field in the PCO message to reduce the length of the data included in the PCO message. APN field 722 may store the name of the particular PDN. The APN (sometimes referred to as the APN network identifier (APN-NI)) may be used to identify the particular PDN by UE device 110 and access network 130. For example, when UE device 110 requests to connect to the particular PDN, the UE device 110 may pass the APN of the particular PDN to MME 220 via eNodeB 210 in the connection request. The APN structure is specified in 3GPP document 23.003 and may include a series of text labels with a maximum length of 100 octets. In some implementations, wireless access network 130 may append the APN received from UE device 110 with an APN Operator Identifier (APN-OI).

Default APN field 724 may store information identifying a default APN among the APNs in APN records 710. UE device 110 may select the default APN when an application requesting a connection is not associated with any other APNs in APN table 700. Preferred attach APN field 726 may store information identifying a preferred attach APN among the APNs in APN records 710. UE device 110 may select to use the preferred attachment APN for subsequent attachments to access network 130.

Although FIG. 7A shows exemplary components of APN table 700, in other implementations, APN table 700 may include fewer components, different components, additional components, or differently arranged components than depicted in FIG. 7A. For example, rather than including default APN field 724 and preferred attach APN field 726, APN table 700 may include flags in entries of particular APN records 710 identifying a default APN and/or a preferred attach APN.

Figures 7B, 7C:
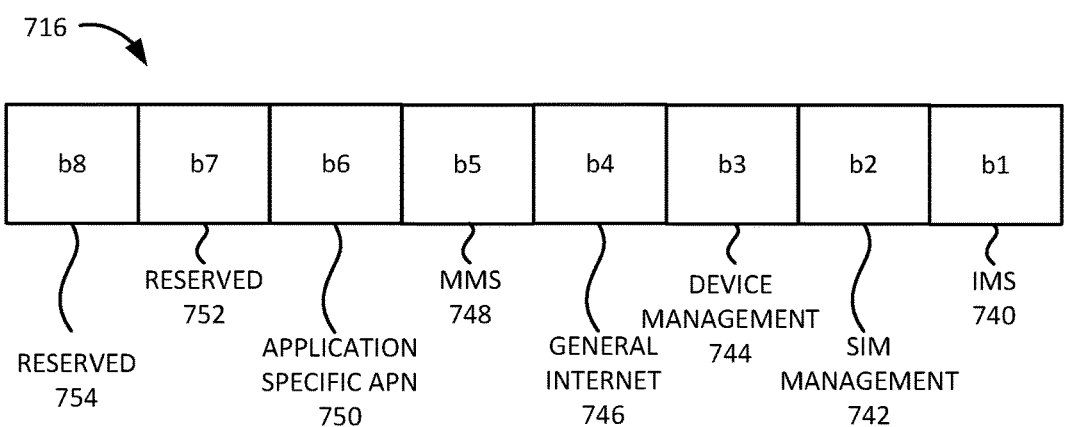

FIG. 7B illustrates exemplary information that may be stored in availability field 714 of APN table 700. As shown in FIG. 7B, availability field 714 may include a set of 8 bits used to represent whether the particular PDN is available only on home networks, only on visited networks, or on both home and visited networks. Furthermore, the set of 8 bits may be further used to represent the type of IP address to be used to access and/or communicate with the particular PDN.

For example, if a bit of 1 represents availability, a bit of 0 represents unavailability, and an X represents a don't care condition, a bit pattern of 1XXXXXXX may indicate that the particular PDN is available on home PLMN (HPLMN) and equivalent home (EHPLMN) networks; a bit pattern of 0XXXXXXX may indicate that the particular PDN is not available on HPLMN/EHPLMN networks; a bit pattern of X1XXXXXX may indicate that the particular PDN is available on visited PLMN (VPLMN) networks; a bit pattern of X0XXXXXX may indicate that the particular PDN is not available on VPLMN networks; a bit pattern of 1X100XXX may indicate that the particular PDN is available for IPv4 on HPLMN/EHPLMN networks; a bit pattern of 1X010XXX may indicate that the particular PDN is available for IPv6 on HPLMN/EHPLMN networks; a bit pattern of 1X001XXX may indicate that the particular PDN is available for IPv4v6 on HPLMN/EHPLMN networks; a bit pattern of X1XXX100 may indicate that the particular PDN is available for IPv4 on VPLMN networks; a bit pattern of X1XXX010 may indicate that the particular PDN is available for IPv6 on VPLMN networks; and a bit pattern of X1XXX001 may indicate that the particular PDN is available for IPv4v6 on VPLMN networks.

FIG. 7C illustrates exemplary information that may be stored in application access field 716 of APN table 700. As shown in FIG. 7B, availability field 714 may include a set of 8 bits used to represent the application access types of the particular PDN with respect to various application types. Thus, if a particular bit is set, the particular PDN may be accessible to an application type associated with the particular bit. A first bit 740 may be set to indicate an IMS APN; a second bit 742 may be set to indicate a SIM management APN; a third bit 744 may be set to indicate a device management APN; a fourth bit 746 may be set to indicate a general Internet access APN; a fifth bit 748 may be set to indicate an MMS APN; a sixth bit 750 may be set to indicate an application specific APN (e.g., an APN associated with a particular application); and seventh bit 752 and eighth bit 754 may be reserved for other types of APNs. For example, seventh bit 752 and/or eighth bit 754 may be reserved for private data network APNs associated with private networks of enterprise customers.

FIG. 8 is a diagram illustrating an exemplary PCO message 800 according to an implementation described herein. As shown in FIG. 8, PCO message 800 may include a PCO header 810, one or more protocol identifier (ID) fields 820-A to 820-N and corresponding protocol content fields 825-A to 825-N, and one or more container ID fields 830-A to 830-N and corresponding container content fields 835-A to 835-N.

PCO header 810 may include information identifying the message as a PCO message. Protocol ID field 820 may identify a particular protocol and protocol content field 825 may include content associated with a particular protocol. The particular protocol may correspond to a protocol used by access network 130 to communicate with UE device 110. Container ID field 830 may identify a particular container and container content field 835 may store content associated with the particular container. Each particular container may be assigned to carry a particular piece of information or multiple pieces of information.

PCO message 800 may include an APN table container ID field 830-X and a corresponding APN table field 835-X. APN table container ID field 830-X may identify APN table field 835-X as storing APN table information and APN table field 835-X may store the APN table information. For example, the APN table information may include the information described above as being stored in APN table 700.

PCO message 800 may also include an APN table update container ID field 830-Y and a corresponding APN table update field 835-Y. APN table update container ID field 830-Y may identify APN table update field 835-Y as storing APN table update information and APN table update field 835-Y may store the APN table update information. In some implementations, the APN table update information may be represented by a value, such as a first value indicating an available update for SIM card 120 and a second value indicating that no new updates are available. In other implementations, the APN table update information may indicate a type of available update, such as an urgency type (e.g., critical update, optional update, etc.); an update type for a particular APN; an update type for a particular customer, and/or other types of updates.

Furthermore, in some implementations, APN table update field 835-Y may include the APN table update information associated with an update. For example, if the APN table update corresponds to an update to a particular PDN, APN table update field 835-Y may include the update for the particular PDN (e.g., information stored in APN record 710 for the particular PDN). SIM card 120 may retrieve the APN table update information from APN table update field 835-Y and may perform the APN table update without having to communicate with SIM OTA system 150. For example, SIM card 120 may replace the stored APN table with the new, updated, APN table received from SIM OTA system 150.

Although FIG. 8 shows exemplary fields of PCO message 800, in other implementations, PCO message 800 may include different, differently arranged, fewer, or additional fields than depicted in FIG. 8. For example, in some implementations, PCO message 800 may only include APN table container ID field 830-X and APN table field 835-X and may not include APN table update container ID field 830-Y and APN table update field 835-Y.

Figure 9:
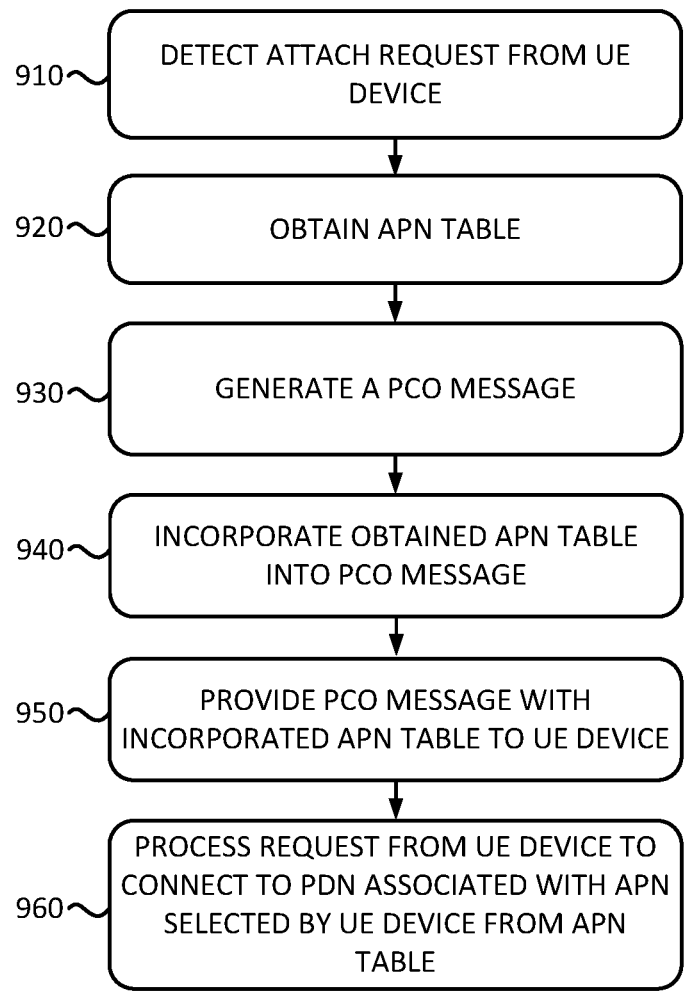
FIG. 9 is a flowchart of a process for providing an APN table to a UE device according to an implementation described herein.

FIG. 9 is a flowchart of a process for providing APN table 700 to a UE device according to an implementation described herein. In some implementations, the process of FIG. 9 may be performed by PGW 240. In other implementations, some or all of the process of FIG. 9 may be performed by another device or a group of devices separate from PGW 240, such as eNodeB 210, MME 220, SGW 230, and/or HSS 250.

The process of FIG. 9 may include detecting an attach request from a UE device (block 910). For example, PGW 240 may receive a create session request from MME 220 on behalf of UE device 110 in response to MME 220 receiving an attach request from UE device 110. An APN table may be obtained (block 920). For example, PGW 240 may request APN table information from HSS 250 via S6b interface 274 and HSS 250 may provide the requested APN table information to PGW 240. A PCO message may be generated (block 930), the obtained APN table information may be incorporated into the PCO message (block 940), and the PCO message may be provided to the UE device (block 950). For example, PGW 240 may incorporate the APN table information into APN table field 835-X of the PCO message and may send the PCO message to UE device 110 via SGW 230 and/or MME 220.

A request from the UE device to connect to a PDN, associated with an APN selected from the APN table, may be processed (block 960). For example, UE device 110 may request to connect to a particular PDN using an APN from the APN table and access network 130 may establish a connection with the particular PDN using the APN. In some implementations, access network 130 may identify a particular PGW 240 associated with the selected APN and may establish a connection to the particular PGW 240 via MME 220, or MME 220 and SGW 230, to which UE device 110 is attached.

Furthermore, the process of FIG. 9 may be used to update APN tables in UE devices 110. For example, PGW 240 (and/or another element in access network 130) may determine that an APN table update is required or requested. In some situations, UE device 110 may request an APN table update when, for example, UE device 110 stores an uninitialized APN table (e.g., during initial activation) or when UE device 110 experiences an attachment or PDN connectivity failure as a result of an invalid APN. In other situations, access network 130 may receive an indication from HSS 250 that an APN table change has been detected for a subscriber associated with UE device 110. In response, HSS 250 may send an indication to PGW 240 that an APN table update is required and PGW 240 may generate a PCO message.

In some situations, HSS 250 may send an indication to MME 220 that an APN has been added, deleted, or changed and MME 220 may determine that UE device 110 should detach and re-attach to access network 130 and instruct UE device 110 to do so. The PCO message may be generated during the re-attachment. In some implementations, the generated PCO message may include the APN table update information incorporated into APN table field 835-X of the PCO message and may send the PCO message to UE device 110 via SGW 230 and/or MME 220. In other implementations, the generated PCO message may include an instruction to UE device 110 to request an APN table update. UE device 110 may update the APN table stored on UE device 110 based on the APN table update.

Figure 10:
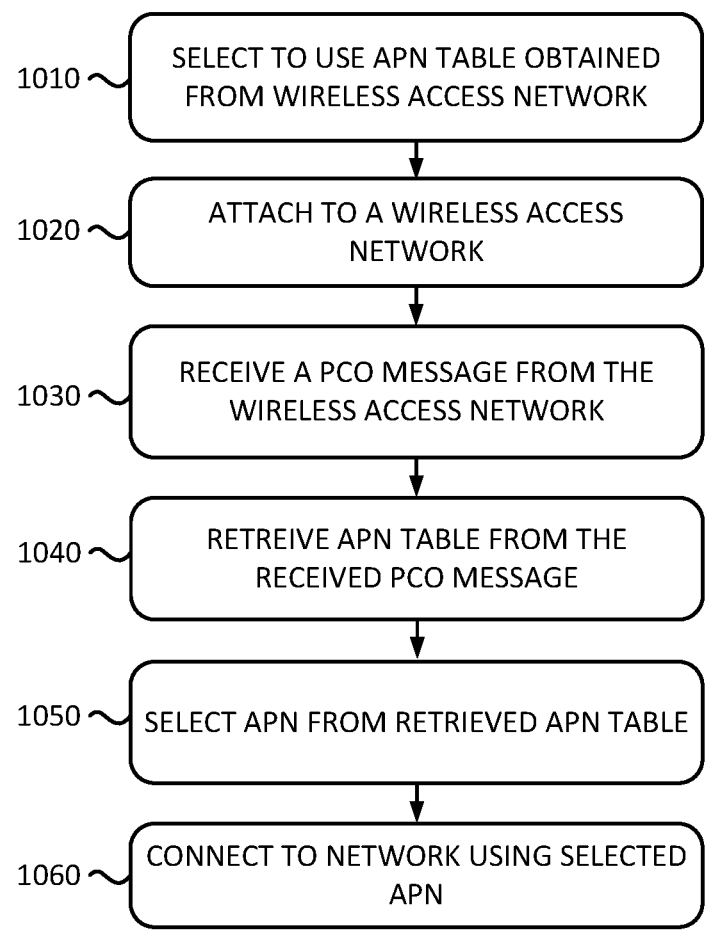
FIG. 10 is a flowchart of a process for selecting an APN table according to an implementation described herein.

FIG. 10 is a flowchart of a process for selecting an APN table according to an implementation described herein. In some implementations, the process of FIG. 10 may be performed by UE device 110. In other implementations, some or all of the process of FIG. 10 may be performed by another device or a group of devices separate from UE device 110, such as SIM card 120.

The process of FIG. 10 may include selecting to use an APN table obtained from the wireless access network (block 1010). For example, UE device 110 may need to be configured to wait to receive APN table information from access network 130 before requesting a connection to an APN. In some implementations, UE device 110 may be configured by the original equipment manufacturer (OEM) to obtain the APN table information from access network 130. In other implementations, SIM card 120 may include instructions to cause UE device 110 to obtain the APN table information from access network 130. In yet other implementations, UE device 110 may request to connect to an APN during an attach procedure and may receive a response from access network 130 (e.g., from eNodeB 210, MME 220, PGW 240, etc.) to wait for APN table information from access network 130. In some implementations, UE device 110 may determine, based on a failure of an attach or PDN connectivity request, to wait for APN table information from access network 130.

An attachment to a wireless access network may be performed (block 1020) and a PCO message from the wireless access network may be received (block 1030). For example, UE device 110 may send an attach request to MME 220 via eNodeB 210 and may receive a PCO message from MME 220 via eNodeB 210 after sending the attach request.

An APN table may be retrieved from the received PCO message (block 1050). For example, connection manager 420 may identify APN table container ID field 830-X and may retrieve the APN table information stored in APN table field 835-X and provide the retrieved APN table information to APN manager 430. APN manager 430 may store the APN table information in APN table 440.

An APN may be selected from the retrieved APN table (block 1050) and a connection to a network may be made using the selected APN (block 1060). For example, application interface 410 may detect a connection request from an application or service on UE device 110. Application interface 410 may identify a type of application making the request and may provide the identified application type to APN manager 430. APN manager 430 may select an APN from APN table 440 based on information stored in application access field 716 of APN records 710 stored in APN table 440 and may send a connection request to MME 220 via eNodeB 210 using the selected APN. Access network 130 may respond by establishing a connection with a PGW 240 or gateway device in core network 140 associated with the selected APN.

Figure 11:
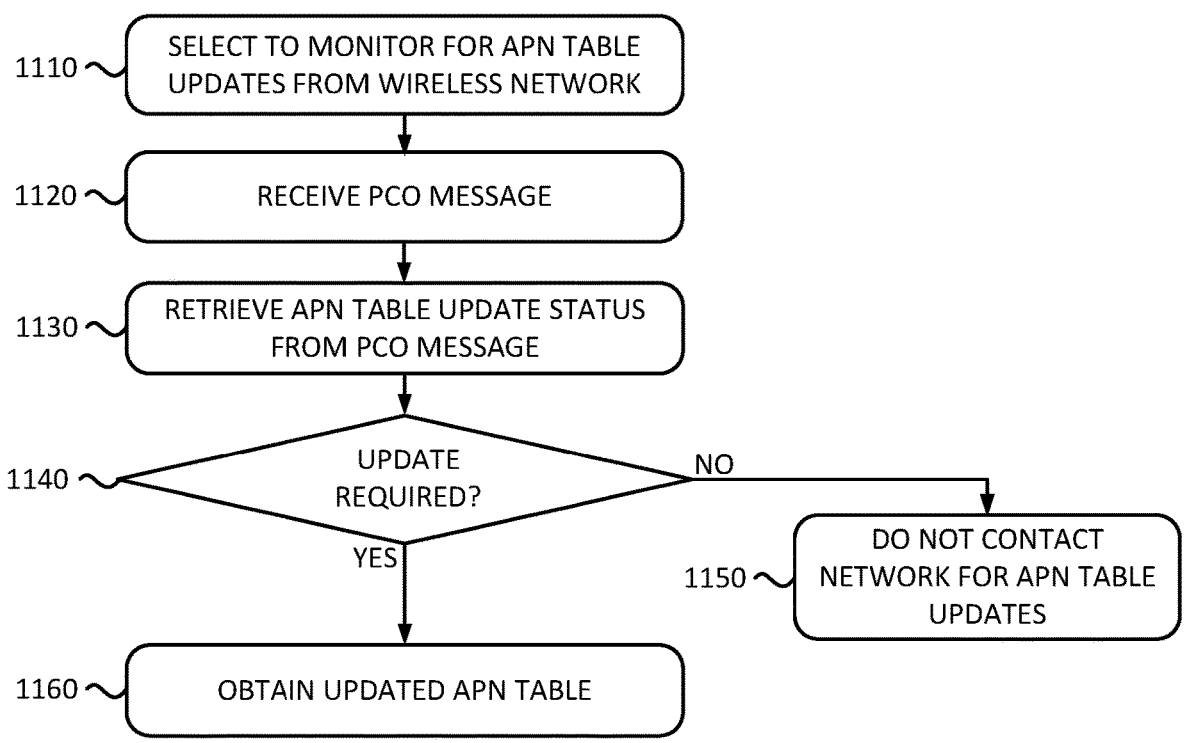
FIG. 11 is a flowchart of a process for updating an APN table according to an implementation described herein.

In some implementations, an APN table may be stored and maintained in SIM card 120. FIG. 11 is a flowchart of a process for updating an APN table stored in SIM card 120 according to an implementation described herein. In some implementations, the process of FIG. 11 may be performed by SIM card 120. In other implementations, some or all of the process of FIG. 11 may be performed by another device or a group of devices separate from SIM card 120, such as UE device 110.

The process of FIG. 11 may include selecting to monitor for APN table updates from a wireless network (block 1110). For example, APN manager 510 may instruct UE device 110 to monitor PCO messages for APN table update information. A PCO message may be received (block 1120) and an APN table update status may be retrieved from the PCO message (block 1130). For example, connection manager 420 may detect that a PCO message has been received by communication interface 340 of UE device 110 from access network 130. In some implementations, the PCO message may be received from PGW device 240 (via SGW device 230 and eNodeB 210). In other implementations, the PCO message may be received from MME device 220 (via eNodeB 210). In yet other implementations, eNodeB 210 may generate the PCO message and send the PCO message to UE device 110. Connection manager 420 may detect APN table update status container ID 830-Y in the received PCO message and may retrieve the APN table update status from APN table update status field 835-Y.

A determination may be made as to whether an update is required (block 1140). As an example, APN manager 510 may determine whether the update information included in the received PCO message indicates that an update is available for APN table 520 at SIM OTA system 150. If it is determined that an update is not required (block 1140-NO), a determination may be made to not contact the network for APN table updates (block 1150). If it is determined that an update is required (block 1140-YES), a determination may be made to obtain an updated APN table (block 1160). As an example, APN manager 510 may initiate an update process with SIM OTA 150. As another example, APN manager 510 may wait for a PCO message that includes an updated APN table. Alternatively, in some implementations, APN manager 510 may be configured to update APN table 5200 without receiving additional PCO messages from access network 130. For example, APN table update status field 835-Y may include information required to perform the update and APN manager 510 may update APN table 520 using update information retrieved from the received PCO message.

In other implementations, an update process may be triggered without a PCO message being generated by access network 130 and sent to UE device 110. For example, in implementation in which an APN table is stored on SIM card 120, SIM OTA system 150 may contact UE device 110 directly to inform UE device 110 that an update for the APN table stored on SIM card 120 is available. As an example, SIM OTA system 150 may send an SMS message to UE device 110. As another example, SIM OTA system 150 may send a message to UE device 110 via an IP protocol to PGW 240 associated with UE device 110. Upon receiving a notification from SIM OTA system 150, UE device 110 may contact SIM OTA system 150 via an IP connection to core network 140 to obtain the APN table update from SIM OTA system 150.

Figure 12:
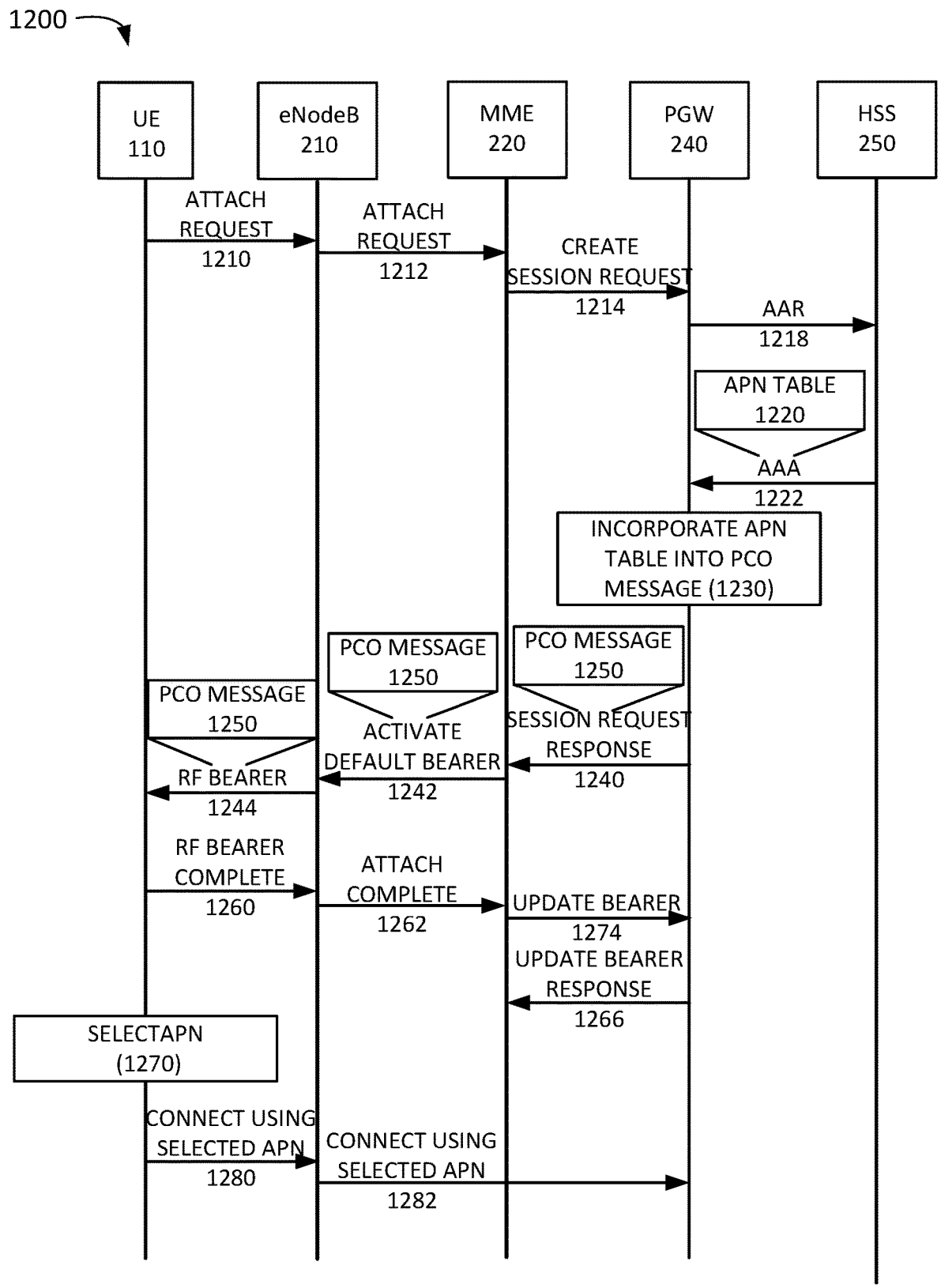
FIG. 12 is a diagram of a first exemplary signal flow according to an implementation described herein.

FIG. 12 is a diagram of a first exemplary signal flow 1200 according to an implementation described herein. As shown in FIG. 12, after UE device 110 is powered on and the communication capability of UE device 110 is activated, UE may detect the presence of eNodeB 210 and may send an attach request to eNodeB 210 (signal 1210). The attach request may include information identifying UE device 110 and/or SIM card 120. eNodeB 210 may forward the attach request to MME 220 (signal 1212). MME 220 may send a create session request to PGW 240 (signal 1214). The create session request may cause PGW 240 to reserve resources for creating a default bearer from UE device 110 to PGW 240 and/or to assign an IP address to UE device 110 in order to enable a connection to core network 140.

In response, PGW 240 may send an Authentication Authorization Request (AAR) to HSS device 250 to authorize an APN for UE device 110 (signal 1218). HSS 250 may retrieve the profile for SIM card 120 and may authenticate SIM card 120. Furthermore, HSS 250 may retrieve APN table information 1220 from APN table 610. HSS 250 may respond with an Authentication Authorization Answer (AAA) to PGW 240 (signal 1220). The AAA may authorize authentication of SIM card 120 and may include the retrieved APN table information 1220.

PGW 240 may generate a PCO message 1250 that includes the APN table information obtained from HSS 250 (block 1230). Furthermore, PGW 240 may reserve the resources, may assign an IP address to UE device 110, and may respond to MME 220 with a session request response, indicating that a session has been created for UE device 110 (signal 1240). The session request response may include the generated PCO message 1230 with the APN table information.

MME 220 may send an activate default bearer instruction to eNodeB 210 and may include PCO message 1250 in the activate default bearer instruction (signal 1242). eNodeB 210 may instruct UE device 110 to set up an RF bearer and may include PCO message 1250 in the instruction (signal 1244). UE device 110 may receive the PCO message via eNodeB 210, may retrieve the APN table information from the PCO message, and may store the APN table information in APN table 440.

UE device 110 may set up the RF bearer and respond with an RF bearer complete message (signal 1260) and eNodeB 210 may report to MME 220 that the attachment procedure is complete (signal 1262). MME 220 may respond by sending an update bearer message to PGW 240 (signal 1264) and PGW 240 may update the bearer based on the requirements of the established RF bearer and may respond back to MME 220 with an update bearer response once the bearer has been updated (signal 1266). The attach procedure may now be competed.

When UE device 110 detects a request to connect to an APN, UE device 110 may select an APN (block 1270), and may connect to the selected APN via eNodeB 210 and PGW 240 (signals 1280 and 1282). For example, in a mobile private network service, or network traffic associated with an enterprise, PGW 240 may include a routing table that routes all traffic associated with the mobile private network service or enterprise to a private PDN gateway associated with the mobile private network service or enterprise. PGW 240 may be able to identify the selected APN based on a routing table associated with access network 130 and may establish a connection with the private PDN gateway device in core network 140 that corresponds to the selected APN.

As explained above, in some implementations, in which the APN table is stored on SIM card 120 (e.g., APN table 520), SIM OTA system 150 may determine that APN table 520 needs to be updated and may cause UE device 110 to request an update via a forced polling mechanism. For example, SIM OTA system 150 may send a message to UE device 110 to poll SIM OTA system 150 for updates and, upon receiving a polling request from UE device 110, may provide an updated APN table to UE device 110. UE device 110 may receive the updated APN table and may provide the updated APN table to SIM card 120. SIM card 120 may replace stored APN table 520 with the received updated APN table. In other implementations, an APN table update mechanism may be implemented via a PCO message, as shown below with respect to FIG. 13.

Figure 13:
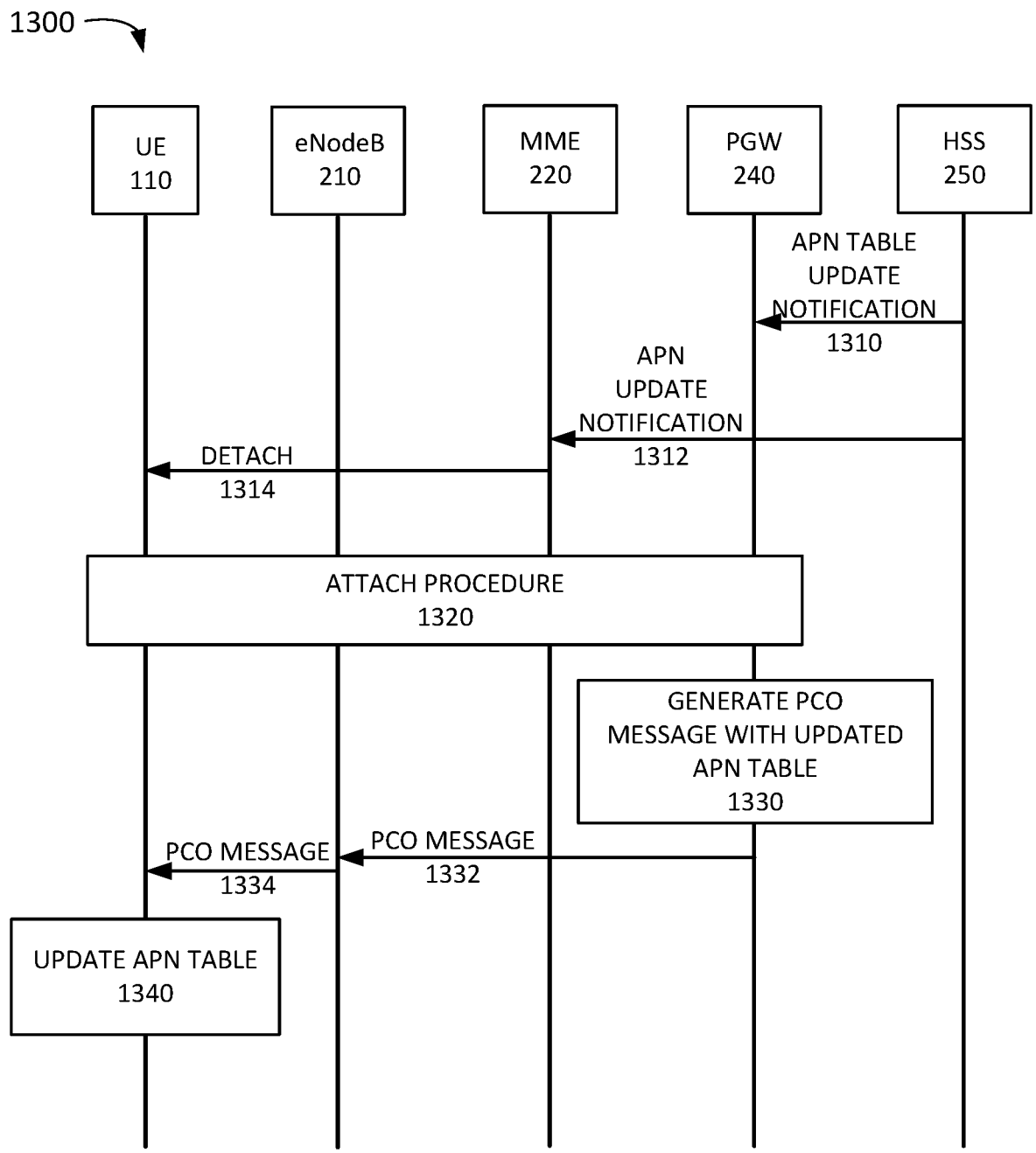
FIG. 13 is a diagram of a second exemplary signal flow according to an implementation described herein.

FIG. 13 is a diagram of a second exemplary signal flow 1300 according to an implementation described herein. In signal flow 1300, an APN table is updated via a PCO message. As shown in FIG. 13, signal flow diagram 1300 may include HSS 250 sending an APN table update notification to PGW 240 (signal 1310). For example, an APN may have been added, deleted, or changed for a particular PDN and HSS 250 may notify PGW 240 that an APN table update has been made. A PCO message may be sent to UE device 110 in a GTP message, such as a Create Session Response message or a Modify Bearer Request message. Thus, PGW 240 may wait for an opportunity to send a PCO message with the updated APN table. For example, PGW 240 may wait for a next attach procedure or for a request to set up a connection to another PDN. In some situations, if, for example, a particular APN changes, such as a preferred attach APN, access network 130 may select to detach UE device 110 and instruct UE device 110 to re-attach. For example, HSS 250 may be configured to notify MME 220 when a particular APN changes and may send an APN update notification to MME 220 (signal 1312). In response, MME 220 may instruct UE device 110 to detach from access network 30 (signal 1314).

After detaching, UE device 110 may re-attach using an attach procedure similar to that described in FIG. 12 (signal 1320).

In response, PGW 240 may generate a PCO message that includes an APN table container ID field 830-X and a corresponding APN table field 835-X with an updated APN table (block 1330). PGW 240 may forward the PCO message to UE device 110 via eNodeB 210 (signals 1332 and 1334). UE device 110 may retrieve the updated APN table from the received PCO message and may perform an APN table update to replace a stored APN table 440 with the updated APN table (block 1340).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 9, 10, and 11, and a series of signal flows has been described with respect to FIGS. 12 and 13, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method performed by a wireless communication device, the method comprising:
   attaching, by the wireless communication device, to a wireless access network;
   receiving, by the wireless communication device, access point name (APN) information from the wireless access network;
   selecting, by the wireless communication device, an APN from the received APN information;
   connecting, by the wireless communication device, to a packet data network (PDN), associated with the selected APN, via the wireless access network using the selected APN;
   detaching, by the wireless communication device, from the wireless access network;
   determining, by the wireless communication device, that the received APN information includes a preferred attachment APN; and
   re-attaching, by the wireless communication device, to the wireless access network using the preferred attachment APN included in the received APN information based on determining that the received APN information includes the preferred attachment APN.

2. The method of claim 1, wherein receiving the APN information from the wireless access network includes:
   receiving a Protocol Configuration Options (PCO) message from the wireless access network; and
   retrieving the APN information from the received PCO message.

3. The method of claim 1, wherein
   determining that the received APN information includes the preferred attachment APN includes:
   selecting to use the preferred attachment APN for subsequent wireless access network attachments, in response to determining that the received APN information includes the preferred attachment APN.

4. The method of claim 1, wherein the APN information includes:
   an APN for a particular PDN;
   an availability for the particular PDN, wherein the availability indicates whether the particular PDN is available on a home network only, on a visited network only, or on both home networks and visited networks; and
   an application access for the particular PDN, wherein the application access indicates a type of application associated with the particular PDN.

5. The method of claim 1, wherein selecting the APN from the received APN information is based on an application requesting a connection.

6. The method of claim 5, wherein the application requesting the connection includes:
an Internet Protocol Multimedia Subsystem (IMS) application;
an Internet access application;
a Multimedia Messaging Service (MMS) application;
a device management application;
a Subscriber Identity Module (SIM) management application; or
an application associated with a private packet data network.

7. The method of claim 1, further comprising:
determining whether the received APN information includes a default APN; and
selecting to use the default APN when an application requesting a connection is not associated with any other APNs in the received APN information, in response to determining that the received APN information includes the default APN.

8. The method of claim 1, further comprising:
determining a Quality of Service (QoS) class associated with an application requesting a connection; and
selecting the APN based on the determined QoS class.

9. The method of claim 1, further comprising:
storing the APN information in a memory device included in the wireless communication device.

10. The method of claim 2, further comprising:
storing the received APN information;
receiving another PCO message from the wireless access network;
retrieving updated APN information from the received other PCO message; and
updating the stored APN information with the updated APN information.

11. A computer device comprising:
a memory configured to store instructions; and
a processor configured to execute the instructions to:
attach to a wireless access network;
receive an access point name (APN) information from the wireless access network;
select an APN from the received APN information;
connect to a packet data network (PDN), associated with the selected APN, via the wireless access network using the selected APN;
detach from the wireless access network;
determine that the received APN information includes a preferred attachment APN; and
re-attach to the wireless access network using the preferred attachment APN included in the received APN information based on determining that the received APN information includes the preferred attachment APN.

12. The computer device of claim 11, wherein, when receiving the APN information from the wireless access network, the processor is further configured to:
receive a Protocol Configuration Options (PCO) message from the wireless access network; and
retrieve the APN information from the received PCO message.

13. The computer device of claim 11, wherein, when determining that the received APN information includes the preferred attachment APN, the processor is further configured to:
select to use the preferred attachment APN for subsequent wireless access network attachments, in response to determining that the received APN information includes the preferred attachment APN.

14. The computer device of claim 11, wherein the APN information includes:
an APN for a particular PDN;
an availability for the particular PDN, wherein the availability indicates whether the particular PDN is available on a home network only, on a visited network only, or on both home networks and visited networks; and
an application access for the particular PDN, wherein the application access indicates a type of application associated with the particular PDN.

15. The computer device of claim 11, wherein selecting the APN from the received APN information is based on an application requesting a connection.

16. The computer device of claim 15, wherein the application requesting the connection includes:
an Internet Protocol Multimedia Subsystem (IMS) application;
an Internet access application;
a Multimedia Messaging Service (MMS) application;
a device management application;
a Subscriber Identity Module (SIM) management application; or
an application associated with a private packet data network.

17. The computer device of claim 11, wherein the processor is further configured to execute the instructions to:
determine whether the received APN information includes a default APN; and
select to use the default APN when an application requesting a connection is not associated with any other APNs in the received APN information, in response to determining that the received APN information includes the default APN.

18. The computer device of claim 11, wherein the processor is further configured to execute the instructions to:
determine a Quality of Service (QoS) class associated with an application requesting a connection; and
select the APN based on the determined QoS class.

19. The computer device of claim 12, wherein the processor is further configured to execute the instructions to:
store the APN information in a memory device included in the computer device;
receive another PCO message from the wireless access network;
retrieve updated APN information from the received other PCO message; and
update the stored APN information with the updated APN information.

20. A non-transitory computer-readable memory device storing instructions executable by a processor, the non-transitory computer-readable memory device comprising:
one or more instructions to attach to a wireless access network;
one or more instructions to receive an access point name (APN) information from the wireless access network;
one or more instructions to select an APN from the received APN information;
one or more instructions to connect to a packet data network (PDN), associated with the selected APN, via the wireless access network using the selected APN;
one or more instructions to detach from the wireless access network;
one or more instructions to determine that the received APN information includes a preferred attachment APN; and
one or more instructions to re-attach to the wireless access network using the preferred attachment APN included in the received APN information based on determining that the received APN information includes the preferred attachment APN.

* * * * *